(12) United States Patent  
Longinov et al.

(10) Patent No.: US 11,716,382 B2  
(45) Date of Patent: Aug. 1, 2023

(54) SYSTEM AND METHOD FOR REPLICATION OF STORAGE PRESENTATION IN APPLICATION ORCHESTRATION

(71) Applicant: Huawei Technologies Co., Ltd., Shenzhen (CN)

(72) Inventors: Vadim Longinov, Marlborough, MA (US); Serge Kornfeld, Waltham, MA (US); Ning Wu, Northborough, MA (US); Xiali He, Upton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 17/348,427

(22) Filed: Jun. 15, 2021

(65) Prior Publication Data

US 2021/0314400 A1  Oct. 7, 2021

Related U.S. Application Data

(63) Continuation of application No. PCT/CN2019/084209, filed on Apr. 25, 2019.

(60) Provisional application No. 62/781,270, filed on Dec. 18, 2018.

(51) Int. Cl.
*H04L 65/1063* (2022.01)
*H04L 67/1095* (2022.01)
*H04L 67/1097* (2022.01)

(52) U.S. Cl.
CPC ...... *H04L 67/1095* (2013.01); *H04L 65/1063* (2013.01); *H04L 67/1097* (2013.01)

(58) Field of Classification Search
CPC ............. H04L 67/1095; H04L 65/1063; H04L 67/1097

USPC ......................................................... 709/223
See application file for complete search history.

(56) References Cited

U.S. PATENT DOCUMENTS

| | | | |
|---|---|---|---|
| 9,798,486 B1* | 10/2017 | Singh | G06F 11/1453 |
| 2007/0233980 A1 | 10/2007 | Cox et al. | |
| 2010/0037031 A1* | 2/2010 | DeSantis | G06F 3/067 |
| | | | 711/E12.103 |
| 2014/0067759 A1* | 3/2014 | Aguilera | G06F 16/184 |
| | | | 707/610 |

(Continued)

OTHER PUBLICATIONS

O. Raluca and P. Florin, "Energy-Efficient Virtual Machine Replication for Data Centers," 2018 17th International Symposium on Parallel and Distributed Computing (ISPDC), Geneva, Switzerland, 2018, pp. 126-132 (Year: 2018).*

(Continued)

*Primary Examiner* — Taylor A Elfervig
(74) *Attorney, Agent, or Firm* — Slater Matsil, LLP

(57) ABSTRACT

An embodiment method creates, at a first data center, a first storage volume for an application that is started at the first data center, communicates with a second data center for creating a second storage volume for the application at the second data center to replicate the first storage volume, and sends information identifying the application to the second data center. The second data center creates the second storage volume, and establishes a mapping between the application and the second storage volume using the information identifying the application, where the second data center identifies the second storage volume for the application using the mapping when the application is migrated from the first data center to the second data center.

22 Claims, 7 Drawing Sheets

(56) References Cited

U.S. PATENT DOCUMENTS

2017/0295246 A1* 10/2017 Georgiou ............ H04L 43/0864
2018/0267830 A1* 9/2018 Rivera .................. G06F 9/5072
2019/0020711 A1* 1/2019 Alfieri ................. H04L 41/5051
2019/0188079 A1* 6/2019 Kohli ...................... G06F 3/067
2020/0036785 A1* 1/2020 Kandula ............ H04L 67/1095

OTHER PUBLICATIONS

M. W. Convolbo, J. Chou, S. Lu and Y. C. Chung, "DRASH: A Data Replication-Aware Scheduler in Geo-Distributed Data Centers," 2016 IEEE International Conference on Cloud Computing Technology and Science (CloudCom), Luxembourg, Luxembourg, 2016, pp. 302-309 (Year: 2016).*

F. Xie, J. Yan and J. Shen, "Towards Cost Reduction in Cloud-Based Workflow Management through Data Replication," 2017 Fifth International Conference on Advanced Cloud and Big Data (CBD), Shanghai, China, 2017, pp. 94-99 (Year: 2017).*

D. S. Jayalakshmi, R. T. P. Rashmi and R. Srinivasan, "Dynamic Data Replication Strategy in Cloud Environments," 2015 Fifth International Conference on Advances in Computing and Communications (ICACC), Kochi, India, 2015, pp. 102-105 (Year: 2015).*

* cited by examiner

SYSTEM AND METHOD FOR REPLICATION OF STORAGE PRESENTATION IN APPLICATION ORCHESTRATION

CROSS-REFERENCE TO RELATED APPLICATIONS

This application is a continuation of International Application No. PCT/CN2019/084209, filed on Apr. 25, 2019, which claims priority to U.S. Provisional Application 62/781,270, filed Dec. 18, 2018, and entitled "System and Method for Replication of Storage Presentation in Application Orchestration," which is hereby incorporated by reference in its entirety.

TECHNICAL FIELD

The present disclosure relates generally to cloud computing and orchestration, and, in particular embodiments, to a system and method for replication of storage presentation in application orchestration.

BACKGROUND

Cloud computing provides great flexibility for accessing and provision computing resources according to clients' needs and requirement. Data centers are designed to provide various resources for cloud computing. Data centers may deploy and execute various applications for providing cloud based services. Application orchestration systems have been known to be used to orchestrate deployed applications in data centers. An application orchestration system may manage and provision various resources, such as servers, memory, storage, databases, and network resources, for execution of applications. In some cases, workload may be migrated and data may be moved across different data centers, e.g., in public clouds, private clouds, public hybrid clouds, or private hybrid clouds, etc., for application containers and virtual machines. It would be desirable if systems and methods may be provided to facilitate workload migration across data centers for cloud computing, particularly, in a hybrid cloud environment.

In accordance with a preferred embodiment of the present disclosure, a computer-implemented method is provided that includes creating, with one or more processors at a first data center, a first storage volume for an application that is being executed at a second data center, in response to receipt of a request from the second data center for storage volume replication. The first storage volume replicates a second storage created for the application at the second data center. The computer-implemented method also includes receiving, from the second data center, information identifying the application; and establishing, at the first data center, a mapping between the application and the first storage volume using the information identifying the application. The computer-implemented method further includes identifying, at the first data center based on the mapping, the first storage volume when execution of the application is moved to the first data center from the second data center. The information identifying the application may include an application storage reference of the application, and the application storage reference is used for identifying storage for the application. The computer-implemented method may also include locating data associated with the application according to the mapping between the application and the first storage volume.

In accordance with another preferred embodiment of the present disclosure, a computer-implemented method is provided that includes creating, with one or more processors at a first data center, a first storage volume for an application that is started at the first data center, and communicating, after the first storage volume is created, with a second data center for creating a second storage volume for the application at the second data center. The second storage volume replicates the first storage volume. The computer-implemented method further includes sending information identifying the application to the second data center for the second data center to use for identifying the second storage volume for the application when execution of the application is moved from the first data center to the second data center, and establishing, at the first data center, a mapping between the application and the first storage volume using the information identifying the application. The information identifying the application may include an application storage reference of the application, and the application storage reference is used for identifying storage for the application. The computer-implemented method may further include locating data associated with the application according to the mapping between the application and the first storage volume.

According to the embodiments of the present disclosure, a first data center creates a first storage volume for an application that is started at the first data center, communicates with a second data center for creating a second storage volume for the application at the second data center to replicate the first storage volume, and sends information identifying the application to the second data center. The second data center creates the second storage volume, and establishes a mapping between the application and the second storage volume using the information identifying the application. Thus, by use of the information identifying the application sent from the first data center to the second data center, the second data center may be able to associate the application with the second storage volume that replicates the first storage volume in the first data center, and as a result, upon migration of the application from the first data center to the second data center, the second data center is able to locate the second storage volume (thus data) associated with the application according to the mapping between the application and the second storage volume.

In this way, orchestration systems in different data centers make use of mapping information to bind application references to storage locations and provide data to applications, avoiding complicated coordination between different orchestration systems, and providing automated procedures to ensure an application to seamlessly migrate across data centers with data in place. The embodiments may be combined with a cross-platform orchestrator, and may be used for various public or private clouds.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
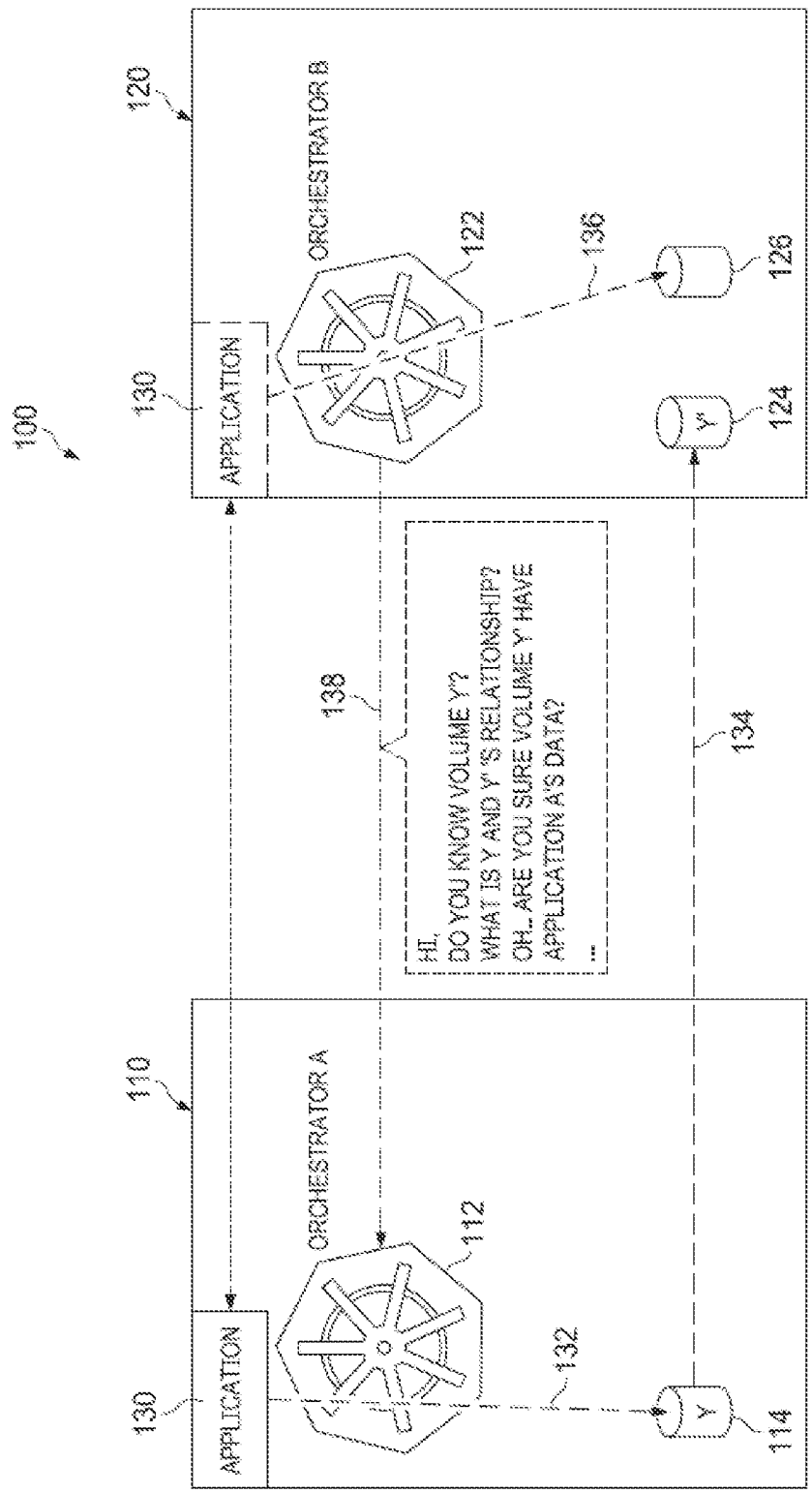
FIG. 1 illustrates a diagram of an embodiment architecture for application orchestration across data centers.

Embodiment methods of the present disclosure provide methods for replicating storage presentation for applications across data centers. Storage presentation may refer to information that is used by an orchestration system to arrange and locate physical storage for an application. In an illustrative example, storage presentation of an application may include application identifying information and a physical storage ID identifying physical storage allocated for storing data associated with the application. For example, A tuple of {"My database of pictures belonging to My Pictures App"; "LUN X on SCSI target Y" } may be used to represent storage presentation for the application of "My Pictures App". Such information may be used to map the physical storage to the application. Replication of storage presentation may be referred to as transferring one or more pieces of storage presentation information from one data center to another. The transferred information may be adjusted such that it is meaningful for an orchestrator in the data center receiving the information. E.g. "LUN X on SCSI target Y" may be adjusted (or changed) to "LUN Z on SCSI target W" in the receiving data center of the information.

An embodiment method creates, at a first data center, a first storage volume for an application that is started at the first data center, communicates with a second data center for creating a second storage volume for the application at the second data center to replicate the first storage volume, sends information identifying the application to the second data center, and establishes, at the first data center, a mapping between the application and the first storage volume using the information identifying the application. The second data center creates the second storage volume, receives the information identifying the application, and establishes a mapping between the application and the second storage volume using the information identifying the application. When the application is migrated from the first data center to the second data center, the second data center may locate data in the second storage volume for the application according to the established mapping between the application and the second storage volume. The second data center may also replicate data and metadata associated with the application from the first data center. In this way, storage presentation of the application at the first data center is replicated at the second data center, and continues to be used at the second data center for the application upon migration of the application to the second data center from the first data center.

Application orchestration systems provide mechanisms for automating deployment, scaling, management and operations of containerized applications, e.g., starting up, monitoring, tearing down, or migration of applications. An application orchestration system manages and provisions resources, such as servers, memory, storage, and network resources, for execution of applications. An application orchestration system may be implemented as software, e.g., a software module or mini-module, and may be a centralized system or a distributed system. An application orchestration system may be deployed in clouds, data centers, servers, or any computer systems.

Modern application orchestration systems provide a mechanism to abstract storage for applications to achieve greater portability. Using such mechanism, applications reference their storage in a way that is not environment specific, but rather application specific. That is, an application does not need to know where a physical storage is for storing data associated with the application. Instead, the application may merely use an application specific reference or name to refer to the storage. It is the responsibility of an application orchestration system to find (and/or create) the physical storage for the application, and provide the physical storage to the application. For example, an application of "My Database of Pictures" may reference its storage using a name or reference of "My Pictures Storage", instead of "LUN X on WWN W" or "share S on NFS server N". The application specific reference or name referring to storage for an application may be referred to as an application storage reference. The application orchestration system uses the application storage reference of an application to create and/or locate physical storage for the application. Throughout the disclosure, the terms of "storage" and "physical storage" are used interchangeably.

The above mechanism to abstract storage for applications works generally well within one orchestration cluster (e.g., one data center), however, it doesn't automatically work across orchestration clusters even, when stored data is replicated between the orchestration clusters by underlying storage systems. An orchestration cluster herein may be referred to as a cluster of resources, such as storage, compute, network, services, etc., that may be provisioned for execution of applications. The following description is presented using a data center as an illustrative example of an orchestration cluster. Application orchestration systems may be used for orchestrating applications deployed in an orchestration cluster. A data center may be a logical, physical or virtualized data center. The following description is provided using application orchestrations systems deployed in data centers as illustrative examples. However, one of ordinary skill in the art would recognize that embodiments of the present disclosure may also be applied to application orchestration systems deployed in various applicable orchestration clusters or platforms.

FIG. 1 illustrates a diagram of an embodiment architecture 100 for application orchestration across data centers. As shown, the architecture 100 includes data centers 110 and 120. The data centers 110 or 120 may be cloud based or on-premises. Each of the data centers 110 and 120 uses an application orchestration system for orchestrating applications. The data centers 110 and 120 may use the same application orchestration system or different application orchestration systems. The data centers 110 and 120 include orchestrators 112 and 122, respectively. An orchestrator herein may be referred to as a logical entity in an orchestration system that is configured to manage and provision resources for executing applications. Each of the data centers 110 and 120 further includes an associated storage system (not shown) for managing data and information storage. The storage system in the architecture 100 may be configured to provide capability to replicate storage volumes between different data centers. A storage volume is a storage space that is identifiable using an identifier, such as a volume number. A storage identifier, e.g., a storage volume, may also be associated with characteristic information about the storage volume, such as a storage size, a storage access type (e.g., block or file), or storage performance (e.g., fast or slow storage).

When an application 130 (e.g., for providing an associated service) is started in the data center no, the orchestrator 112 may, at step 132, issue a request to its associated storage system to create a new storage volume for the application 130. In response, the storage system associated with the data center 110 creates a storage volume 114, i.e., storage volume Y. Multiple storage volumes may be created for the application 130. The storage volume 114 may be identified by a volume number, e.g., volume 17. While creating the storage volume Y (114), the storage system associated with the data center 110 also communicates with one or more storage systems in other data centers to create replication volume(s) of the storage volume Y. As shown, at step 134, the storage system associated with the data center 110 communicates with the storage system associated with the data center 120 to create a replication volume(s) of the storage volume Y. Communication between different data centers may be wireless or wired communications. As a result, the storage system associated with data center 120 creates a storage volume Y' (124) that replicates the storage volume Y (114) in the data center 110. The storage volume 124 may be identified by a volume number, e.g., volume 73. With the replication storage volume Y' (124) created, data stored in the storage volume Y (114) associated with the application 130 may also be replicated in the storage volume Y' (124). However, while the storage volume Y' (124) is created in the data center 120, the data center 120 (e.g., the orchestrator 122) does not know which application the storage volume Y' (124) is associated with, or which application the storage volume Y' (124) belongs to.

In some cases, the application 130 may be migrated to the data center 120 from the data center 110. In this case, the application 130 started in the data center 110 will be executed in the data center 120, using resources of the data center 120. That is, execution of the application is moved from the data center 110 to the data center 120. This may happen when workload needs to be moved across data centers. For example, servers of the data center 110 are down (e.g., out of power, or out of order) or under maintenance, or the data center 110 is overloaded, etc. In these cases, the data center 110 is not able to support running of the application 130, and the application 130 needs to be moved to another data center (e.g., the data center 120), for continuing to provide related services. In another example, communication paths to or from the data center 110 may experience heavy traffic jam, or a customer is closer to another data center than the data center 110. In these cases, the application 130 may be migrated to another data center so that services with improved quality may be provided to customers. The data center 110 may be referred to as a primary data center for the application 130, and the data center 120 may be referred to as a secondary data center for the application 130, for the application 130 is started in the data center 110 and migrated to the data center 120.

When the application 130 is migrated to the data center 120, because the orchestrator 122 does not know that the storage volume Y' has already been created for the application 130, in one example, the orchestrator 122 may treat the application 130 as a new application started in the data center 120, and thus creates, at step 136, a storage volume 126 for the application 130. In this case, two different storage volumes, i.e., 124 and 126, are created in the data center 120 for the same application 130. The storage volume 124 may have data of the application 130 that was generated during execution of the application 130 in the data center 110 (and replicated to the storage volume 124), while the storage volume 126 does not have the data. This consequently causes inefficient use of storage space of the data center 120. In another example, the orchestrator 122 may not create the storage volume 126, instead, the orchestrator 122 communicates, at step 138, with the orchestrator 112 to determine whether a storage volume has been created for the application 130 in the data center 120, e.g., whether the storage volume 124 is for (thus associated with) the application 130. As an illustrative example, the orchestrator 122 may send messages to the orchestrator 112, including information such as "Do you know Volume Y'?", "What is the relationship between Y and Y'?", or "Are you sure Volume Y' has data of the application 130?" In this case, orchestrators have to discover each other to figure out relationships between a storage volume and an application in order to use the storage volume for the application.

Figure 2:
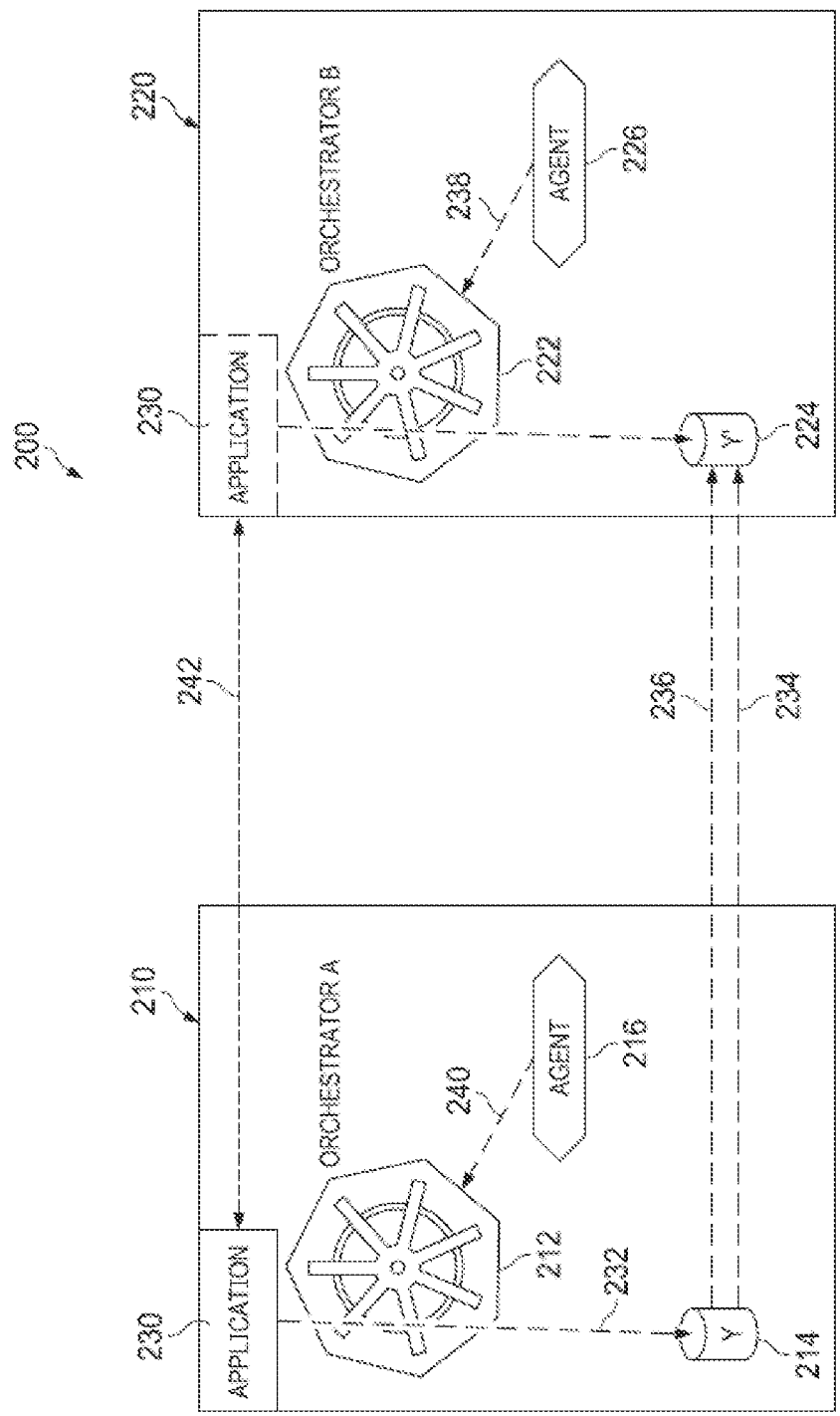
FIG. 2 illustrates a diagram of another embodiment architecture for application orchestration across data centers.

Embodiments of the present disclosure provide methods that facilitate a replication storage volume in a data center to be used for an application migrated from another data center. FIG. 2 illustrates a diagram of an embodiment architecture 200 for application orchestration across data centers. As shown, the architecture 200 includes data centers 210 and 220. The data centers 210 and 220 are similar to the data centers 110 and 120 as illustrated in FIG. 1. The data centers 210 or 220 may be cloud based or on-premises. The data centers 210 and 220 may be deployed in public clouds, private clouds, or hybrid clouds. Each of the data centers 211 and 220 uses an application orchestration system for orchestrating applications. The data centers 210 and 220 may use the same application orchestration system or different application orchestration systems. The data centers 210 and 220 include orchestrators 212 and 222, respectively. Each of the data centers 210 and 220 further includes an associated storage system (not shown) for managing data and information storage. A storage system provides capability to replicate storage volumes between different data centers.

An application 230 is started in the data center 210 and executed using resources provisioned by the orchestrator 212. The orchestrator 212 may, at step 232, issue a request to its associated storage system to create a new storage volume for the application 230. In response, the storage system associated with the data center 210 creates a storage volume 214, i.e., storage volume Y. The storage volume 214 may be identified by a volume number, e.g., volume 17. While creating the storage volume Y (214), the storage system associated with the data center 210 communicates, at step 234, with the storage system associated with the data center 220 to create a replication volume of the storage volume Y (214). As a result, the storage system associated with data center 220 creates a storage volume Y' (224) that replicates the storage volume Y (214) in the data center 210. The storage volume 224 may be identified by a volume number, e.g., volume 73. With the replication storage volume Y' (224) created, data stored in the storage volume Y (214) associated with the application 130 may also be replicated in the storage volume Y' (224). The storage volume Y (214) may be synchronized with the storage volume Y' (224).

At step 236, the storage system associated with the data center 210 sends, to the data center 220, information that identifies the application 230, for which the storage volume 214 is created. This may be viewed as replicating, by the data center 210, the information that identifies the application 230 to the data center 220. The information identifying the application 230 may include information specific to the application 230, such as identification information or metadata (e.g., manifest) of the application 230. The information identifying the application 230 may be used by the application 230 to reference a storage and used by the orchestrator 212 to locate the physical storage volume 214 for the application 230. In one example, the information identifying the application 230 may be an application storage reference of the application 230, such as "My Pictures Storage" for the example application of "My Database of Pictures" described above. The application storage reference is used by the application to reference its storage. For example, the application of "My Database of Pictures" uses "My Pictures Storage" to reference its storage, and an orchestrator uses "My Pictures Storage" to identify a physical storage for the application. Both steps 234 and 236 may be performed during communication between the storage system associated with the data center 210 and the storage system associated with the data center 220. The storage system associated with the data center 220 may then cooperate with the orchestrator 222 to establish a mapping between the application and the storage volume 224 using the information identifying the application 230 (such as the application storage reference of the application 230), e.g., in a way that is specific to the data center 220's environment. Storage volumes may be different in different data centers, e.g., volumes may use different identifiers, have different structures, or have different numbers. Thus, a storage volume in a data center may be specific to the data center, and a mapping established between the storage volume and an application may also be specific to the data center. For example, the data center 210's mapping for the application 230 may include a tuple ("My Pictures Storage", 17), and a similar mapping in the data center 220 may include a tuple ("My Pictures Storage", 73). Thus, a mapping is established between the application storage reference of the application 230 and the storage volume 224. The storage volume 224 is associated with the application 230. When the application 230 is migrated to the data center 220 from the data center 210, by use of the mapping established between the application 230 and the storage volume 224, the orchestrator 222 is able to determine that there is a storage volume (i.e., the storage volume 224) that has been created belonging to the migrated application 230, and thus locate data for the application 230 in the storage volume 224. In this case, the orchestrator 222 does not need to communicate with the orchestrator 212 to determine relationship between the application and the replication storage volume 224; neither does the orchestrator 222 need to create a new storage volume upon migration of the application 230 to the data center 220.

When the storage volume 214 is created, the storage system associated with the data center 210 may cooperate with the orchestrator 212 to establish a mapping between the application 230 and the storage volume 214 using the information identifying the application 230, such as the application storage reference of the application 230. Thus, a mapping is established between the application storage reference of the application 230 and the storage volume 214, and the storage volume 214 is associated with the application 230. By use of the mapping between the application 230 and the storage volume 214, the orchestrator 212 is able to locate the storage volume 214 for the application 230 in the data center 210.

In some embodiments, the information identifying the application may not be replicated verbatim. The information identifying the application, e.g., metadata, may be modified to reflect the differences in the storage environment. For example, an application's storage "My Picture Storage" may reside on a volume 17 in the data center 210, which is replicated to a volume 73 in the data center 220. Consequently, the mapping established in the data center 220 may need to refer to volume 73, instead of 17. In some embodiments, replication of the information identifying the application may include format conversion, in cases where data centers use different application orchestration systems. For example, the application storage reference of the application 230 in the data center 210 may be represented using character strings, while the data center 220 uses a different way to represent the application storage reference, e.g., using a numeric ID to represent the application storage reference. In this case, replication of the application storage reference from the data center 210 to the data center 220 may include converting the character strings of the application storage reference to a numeric ID (which may be generated using the character strings), and then replicating the numeric ID in the data center 220.

In some embodiments, the data centers 210 and 220 may include agents 216 and 226, respectively. An agent herein serves as a proxy for communications between an orchestration system and a storage system. An agent may communicate logics between an application and storage to an orchestrator automatically and accurately. Orchestrators don't need to add extra logics to identify storage attributes. The agent may work with all types of orchestrators in a seamless fashion. In one embodiment, an agent may communicate with a storage system to create a storage volume for an application in response to a request from an orchestrator. For example, when an application is started in the data center 210, the orchestrator 212 may request, through the agent 216, the storage system associated with the data center 210 to create the storage volume 214. In another embodiment, an agent may use replicating capability of a storage system, and initiate sending of information identifying an application running in a data center to different data centers, e.g. as in step 236, via the storage system. In another embodiment, an agent may assist an orchestrator to establish a mapping between an application and a storage volume by use of information identifying the application, e.g., as in steps 238 and 240. The agent 226, 216 may obtain the information identifying the application from the respective storage volumes 224, 214, and provide the information to the respective orchestrators 222, 212 for mapping. In another embodiment, an agent may also use replicating capability of a storage system to replicate metadata across different data centers. The storage replication layer of a storage system may replicate not only data but also any metadata related to applications, if requested. Metadata may include a data center's application attributes or states, and/or storage attributes or states. The metadata may be communicated (replicated) to one or more other data centers (or sites). Knowledge of storage, e.g., storage attributes or states, may provide more flexibilities for orchestrators to select a right storage for an application for various of purposes, such as failover, migration, snapshots or performance. An agent may be implemented as software, and may be integrated with an orchestration system or a storage system.

In the embodiment illustrated in FIG. 2, a mapping is established between the application 230 and its storage volume in a corresponding data center using the information identifying the application 230. The orchestrator is able to locate the physical storage of the application in the corresponding data center based on the mapping. The information identifying the application may also include other metadata used by the application 230 with reference to an associated resource in a data center, such as a database, a communication path, a server, etc. The information may be used to establish a mapping between the application and the associated resource, and facilitate locating of the associated resource during application migration across different data centers.

Figure 3:
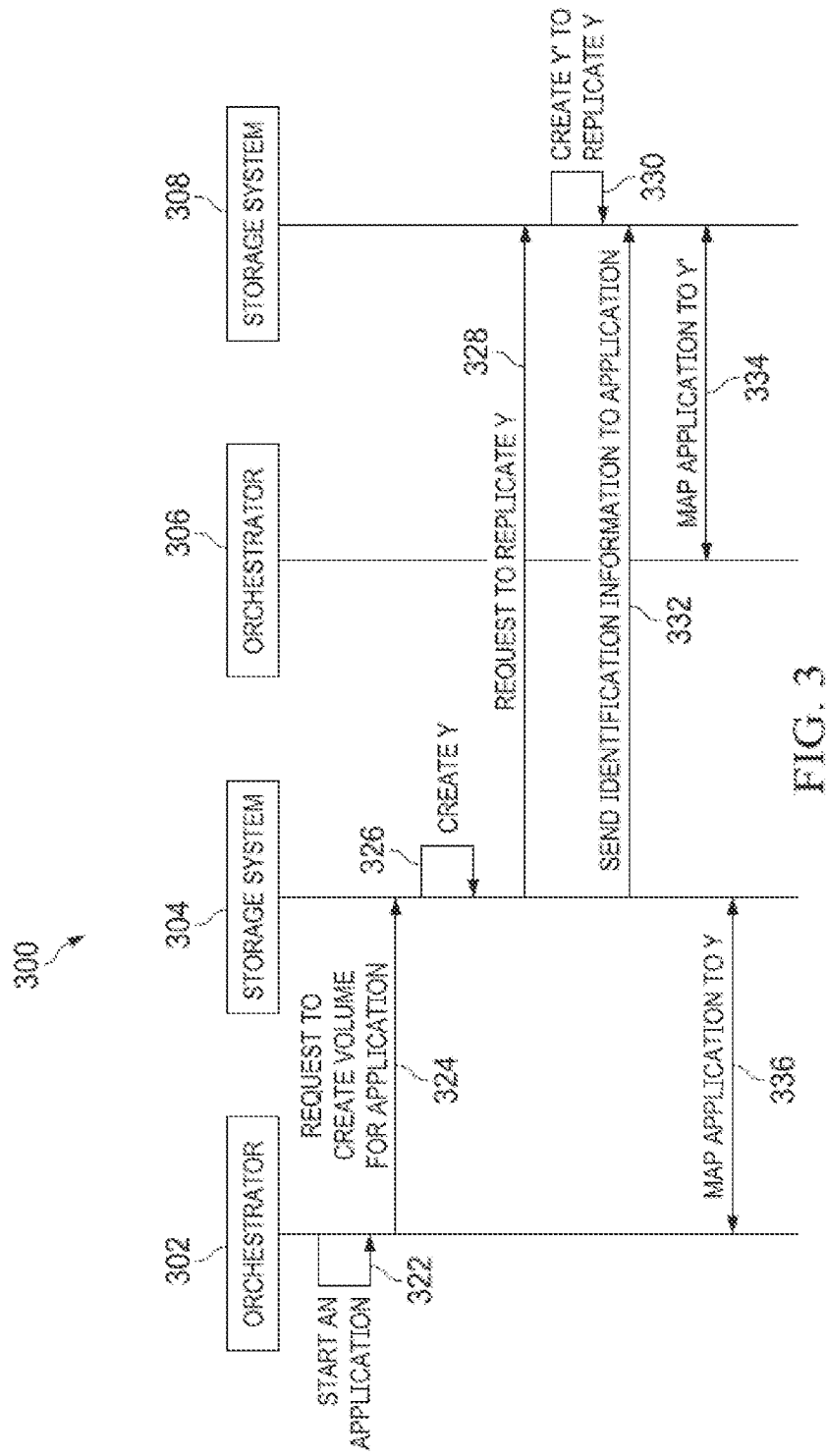
FIG. 3 illustrates a diagram of an embodiment method for application orchestration.

FIG. 3 illustrates a diagram of an embodiment method 300 for application orchestration. In this example, a first data center has an application orchestration system including an orchestrator 302, and a storage system 304. A second data center has an application orchestration system including an orchestrator 306, and a storage system 308. Applications may be migrated across the first and second data centers. As shown, at step 322, the orchestrator 302 starts an application in the first data center. At step 324, the orchestrator 302 requests the storage system 304 to create a storage volume for the application. At step 326, the storage system 304 creates a storage volume Y in response to the request. At step 328, the storage system 304 requests the storage system 308 to replicate the storage volume Y in the second data center. One or more replication policies may be defined for replicating storage volumes in the data center. According to a replication policy, in one example, the storage system 304 may automatically replicate a newly created volume. A replication policy may define whether a storage volume is replicated. A replication policy may further define where to replicate (i.e., determining other data centers to which a storage volume is replicated) and how many replicas to be made. A replication policy may also specify a type of replication (e.g., synchronous or asynchronous), service level agreement (SLA), quality of service (QoS) or other performance characteristics. The storage system 308, in response, creates a storage volume Y' that replicates the storage volume Y at step 330. At step 332, the storage system 304 sends identification information of the application to the storage system 308. Before step 332, in one example, the storage system 304 may request the application identification information from the orchestrator 302 upon receiving the request to create a volume for the application. In another example, the orchestrator 302 may send the identification information of the application to the storage system 304, e.g., periodically, upon a request from the storage system or an agent, or when sending the request to create a volume for the application at step 324. The steps 326, 328 and 332 may be performed at the same time. The step 330 may be performed after the step 332. At step 334, the storage system 308 cooperates with the orchestrator 36 to map the application to the replication storage volume Y' using the identification information of the application. At step 336, the storage system 304 cooperates with the orchestrator 302 to map the application to the replication storage volume Y using the identification information of the application. The step 334 may be performed before or after the step 336, or at the same time as the step 336. Upon the application is migrated to the second data center, the orchestrator 306 is able to locate the data for the application by use of the mapping between the application and the replication storage volume Y'.

Figure 4:
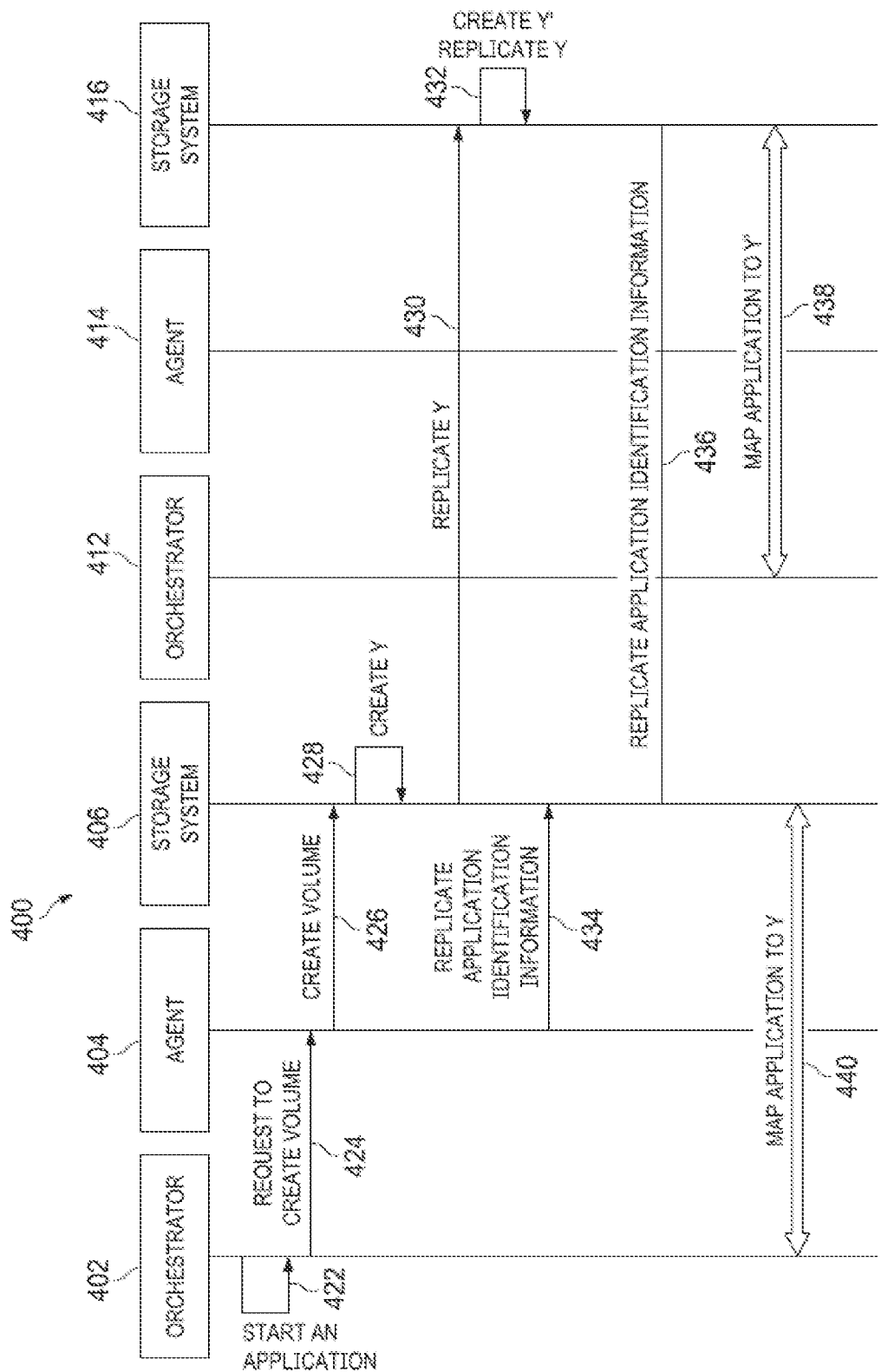
FIG. 4 illustrates a diagram of another embodiment method for application orchestration.

FIG. 4 illustrates a diagram of another embodiment method 400 for application orchestration. In this example, a first data center has an application orchestration system including an orchestrator 402, an agent 404 and a storage system 406. A second data center has an application orchestration system including an orchestrator 412, an agent 414 and a storage system 416. Applications may be migrated across the first and second data centers. As shown, at step 422, the orchestrator 402 starts an application in the first data center. At step 424, the orchestrator 402 requests the agent 404 to create a storage volume for the application. At step 426, the agent 404 requests the storage system 406 to create a storage volume. At step 428, the storage system 406 creates a storage volume Y in response. At step 430, the storage system 406 requests the storage system 416 to replicate the storage volume Y in the second data center. At step 432, the storage system 416, in response, creates a storage volume Y' that replicates the storage volume Y. At step 434, the agent 404 requests the storage system 406 to replicate identification information of the application to the storage system 416 for the application. Steps 426 and 434 may be combined into one step and performed at the same time. At step 436, the storage system 406 replicates the identification information of the application to the storage system 416. Steps 430 and 436 may be combined into one step and performed at the same time. At step 438, the agent 414 interacts with the orchestrator 412 and the storage system 416 to create a mapping between the application and the storage volume Y using the identification information of the application. At step 440, the agent 404 interacts with the orchestrator 402 and the storage system 406 to create a mapping between the application and the storage volume Y using the identification information of the application.

Embodiments of the present disclosure provide modifications to storage's replication mechanisms to enable the replication mechanisms to integrate with application orchestration systems in different data centers, and to replicate information, such as metadata, that may be used by orchestrators to perform mapping between application specific, environment-independent storage references and physical storage provided by a storage system. Orchestrators in different data centers, where data of a particular application is replicated, are able to create mappings between environment-independent application storage references and the physical storage in corresponding data centers. Whenever an application is re-started in any of these data centers, it is able to automatically get access to its data from the previous invocations regardless of where it ran before. An orchestrator thus may pair accurately a replication relationship for a data set (or a volume) with volume presentation provisioning for an application. An application started in a data center may presents its need for storage to an orchestrator, and the orchestrator may check whether there is a corresponding mapping between the application and a storage volume having source data for the application, based on the application storage reference. The orchestrator may create a mapping for the application if it does not find one for the application. Orchestration systems use mapping information to bind application references to storage locations and provide data to applications. The embodiments of the present disclosure does not require complicated coordination between different orchestration systems, and provides automated procedures to ensure an application to seamlessly migrate across data centers with data in place. The embodiments also eliminate the need for two orchestration systems to communicate about replicated volumes presented to an application that is using the same data set. The embodiments may be combined with a cross-platform orchestrator, e.g., Kubernetes, and may be used for various public or private clouds.

Figure 5:
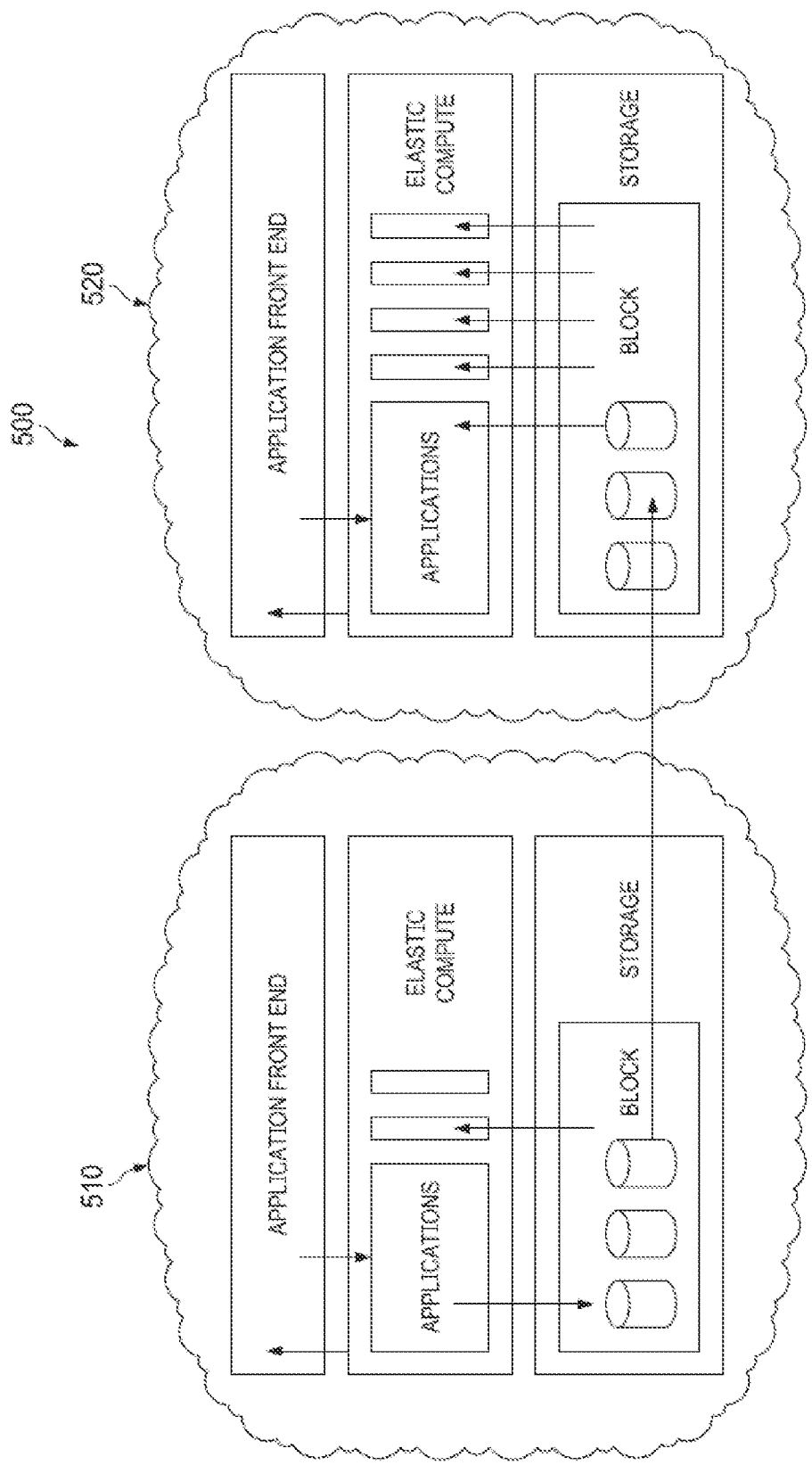
FIG. 5 illustrates a diagram of an embodiment hybrid cloud architecture.

FIG. 5 illustrates a use case where the embodiment methods of the present disclosure may be used. FIG. 5 illustrates a diagram of an embodiment hybrid cloud architecture 500. The architecture 500 includes an on-premises data center 510 and a public cloud based data center 520 (e.g. in Google Cloud Environment or AWS Environment). The data center 510 includes an application front end in a physical location of the data center 510, and the data center 520 includes an applications front end in the US Central zone of a Google Cloud. An application front end provides a user access point (e.g., Web based) to the applications, which may perform load balancing, prioritization and queuing services. Each of the data centers 510 and 520 may include storage, such as block storage. The data centers 510 and 520 may support elastic computing. For example, computing resources may be scaled up and down, e.g., in response to workload changes. Each of the data centers 510 and 520 have deployed various applications, e.g., for DR, scale out, or other types of processing. Orchestration systems (e.g., Kubernetes services) are used to orchestrate the applications. Execution of the applications may involve data management and manipulation, such as storing data in or retrieving data from the storage. For example, applications executed in a data center may need to find data on start, restart, or scale out. In some cases (e.g., due to workload changes), an application is migrated from the data center 510 to the data center 520, and data sets need to be replicated across the data centers. By use of the embodiment methods, an application storage reference of the application may be replicated (sent to the data center 520 from the data center 510) between the on-premises cloud and the public could, and based thereon, the orchestration system (an orchestrator) in the data center 520 is able to establish a mapping between the application and a storage space where replicated data of the application has been stored in the data center 520. The orchestration system in the data center 520 is thus able to locate data for the application using the mapping upon the application is migrated to the data center 520.

Figure 6:
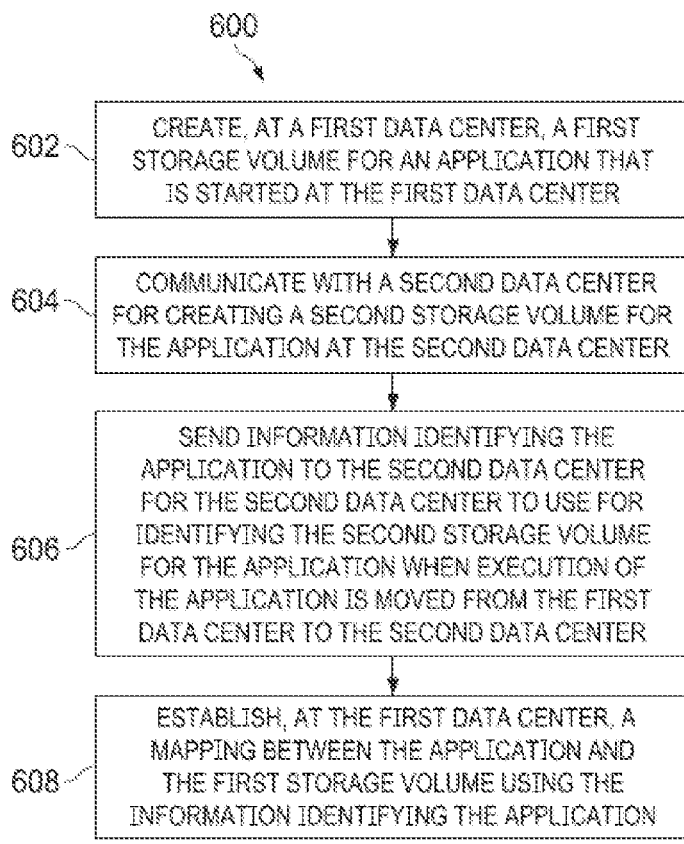
FIG. 6 illustrates a flowchart of an embodiment method for application orchestration.

FIG. 6 illustrates a flowchart of an embodiment computer-implemented method 600 for application orchestration. As shown, at step 602, the method 600 creates, at a first data center, a first storage volume for an application that is started at the first data center. At step 604, the method 600 communicates with a second data center for creating a second storage volume for the application at the second data center. Step 604 is performed after the first storage volume is created. The second storage volume replicates the first storage volume. At step 606, the method 600 sends information identifying the application to the second data center for the second data center to use for identifying the second storage volume for the application when execution of the application is moved from the first data center to the second data center. At step 608, the method establishes, at the first data center, a mapping between the application and the first storage volume using the information identifying the application.

Figure 7:
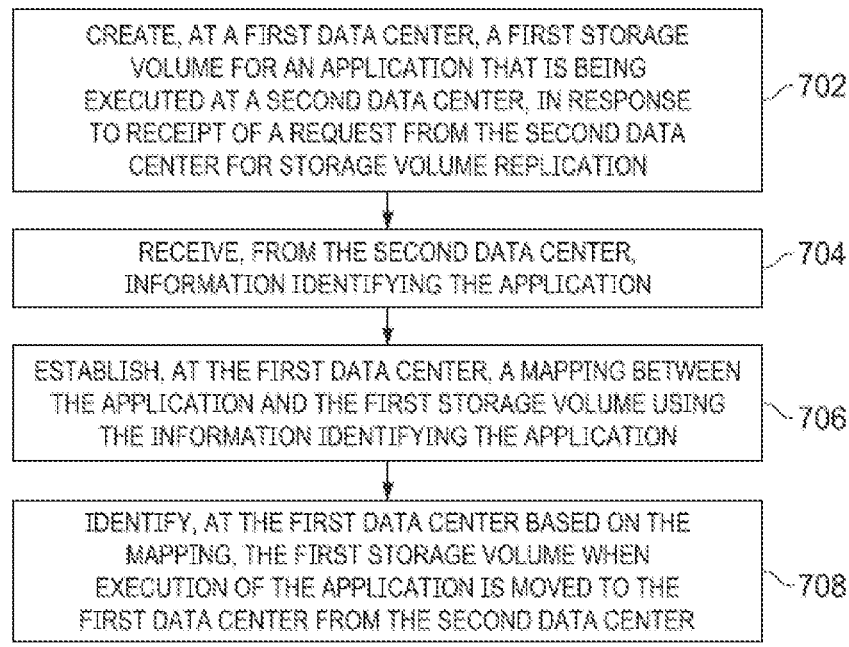
FIG. 7 illustrates a flowchart of an embodiment method for application orchestration.

FIG. 7 illustrates a flowchart of an embodiment computer-implemented method 700 for application orchestration. As shown, at step 702, the method 700 creates, at a first data center, a first storage volume for an application that is being executed at a second data center, in response to receipt of a request from the second data center for storage volume replication. The first storage volume replicates a second storage created for the application at the second data center. At step 704, the method receives, from the second data center, information identifying the application. At step 706, the method 700 establishes, at the first data center, a mapping between the application and the first storage volume using the information identifying the application. At step 708, the method 700 identifies, at the first data center based on the mapping, the first storage volume when execution of the application is moved to the first data center from the second data center.

Embodiment methods of the present disclosure may be computer-implemented methods, and performed using one or more processors. An embodiment method may be embodied in the form of a software product. A software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute embodiments of the methods disclosed herein.

Figure 8:
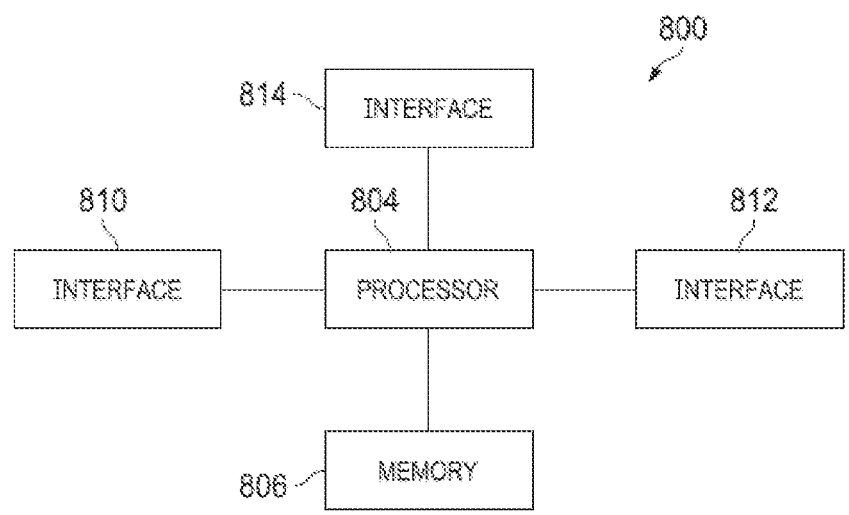
FIG. 8 illustrates a diagram of an embodiment processing system.

FIG. 8 illustrates a block diagram of an embodiment processing system 800 for performing the methods described herein, which may be installed in a host device. As shown, the processing system 800 includes a processor 804, a memory 806, and interfaces 810-814, which may (or may not) be arranged as shown in FIG. 8. The processor 804 may be any component or collection of components adapted to perform computations and/or other processing related tasks, and the memory 806 may be any component or collection of components adapted to store programming and/or instructions for execution by the processor 804. In an embodiment, the memory 806 includes a non-transitory computer readable medium. The interfaces 810, 812, 814 may be any component or collection of components that allow the processing system 800 to communicate with other devices/components and/or a user. For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), etc.) to interact/communicate with the processing system 800. The processing system 800 may include additional components not depicted in FIG. 8, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 9:
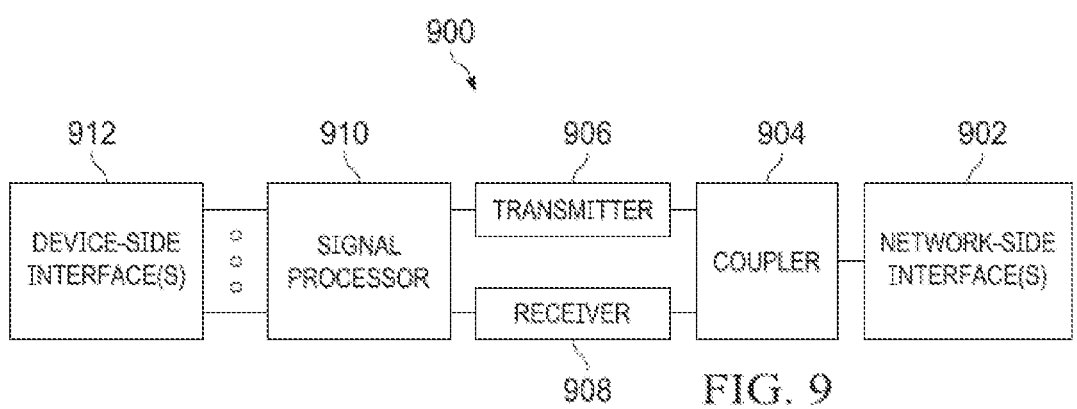
FIG. 9 illustrates a diagram of an embodiment transceiver.

In some embodiments, one or more of the interfaces 810, 812, 814 connects the processing system 800 to a transceiver adapted to transmit and receive signaling over the telecommunications network. FIG. 9 illustrates a block diagram of a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (IAN) ports, etc.).

The transceiver 900 may transmit and receive signaling over any type of communications medium. In some embodiments, the transceiver 900 transmits and receives signaling over a wireless medium. For example, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a communicating unit/module, a mapping establishing unit/module, a creating unit/module, a replicating unit/module, a requesting unit/module, a mapping unit/module, an application orchestration unit/module, and/or a storage locating unit/module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A computer-implemented method comprising:
creating, by a first data center, a first storage volume for an application that is being executed at a second data center, in response to receipt of a request from the second data center for storage volume replication, the first storage volume replicating a second storage volume created for the application at the second data center;
receiving, by the first data center, information identifying the application from the second data center,
wherein the first data center receives the request from the second data center for the storage volume replication while the second storage volume is being created at the second data center, and wherein the first storage volume is created before the information identifying the application from the second data center is received;
establishing, by the first data center, a mapping between the application and the first storage volume using the information identifying the application;
notifying, by the first data center, a first application orchestration system used by the first data center about the mapping between the application and the first storage volume; and
identifying, by the first data center, the first storage volume based on the mapping in response to execution of the application being moved from the second data center to the first data center.

2. The computer-implemented method of claim 1, wherein the information identifying the application includes an application storage reference of the application, the application storage reference being used for identifying storage for the application.

3. The computer-implemented method of claim 1, further comprising:
replicating, by the first data center, data or metadata associated with the application from the second data center to the first data center.

4. The computer-implemented method of claim 1, wherein the first data center and the second data center use different application orchestration systems.

5. The computer-implemented method of claim 1, further comprising:
locating, by the first data center, data associated with the application according to the mapping between the application and the first storage volume.

6. A first data center comprising:
at least one processor; and
a non-transitory computer readable storage medium storing programming for execution by the at least one processor, the programming including instructions to:
create a first storage volume for an application that is being executed at a second data center, in response to receipt of a request from the second data center for storage volume replication, the first storage volume replicating a second storage volume created for the application at the second data center;
receive information identifying the application from the second data center,
wherein the first data center receives the request from the second data center for the storage volume replication while the second storage volume is being created at the second data center, and wherein the first storage volume is created before the information identifying the application from the second data center is received;

establish a mapping between the application and the first storage volume using the information identifying the application;

notify a first application orchestration system used by the first data center about the mapping; and identify the first storage volume based on the mapping in response to execution of the application being moved from the second data center to the first data center.

7. The first data center of claim 6, wherein the information identifying the application includes an application storage reference of the application, the application storage reference being used for identifying storage for the application.

8. The first data center of claim 6, wherein the programming further includes instructions to:

replicate data or metadata associated with the application from the second data center to the first data center.

9. The first data center of claim 6, wherein the first data center and the second data center use different application orchestration systems.

10. The first data center of claim 6, wherein the programming further includes instructions to:

locate data associated with the application according to the mapping between the application and the first storage volume.

11. A computer-implemented method comprising:

creating, by a first data center, a first storage volume for an application that is started at the first data center;

communicating, by the first data center, with a second data center for creating a second storage volume for the application at the second data center, the second storage volume replicating the first storage volume;

sending, by the first data center, information identifying the application to the second data center for the second data center to notify an application orchestration system used by the second data center about a mapping between the application and the second storage volume using the information identifying the application and for the second data center to use for identifying the second storage volume for the application when execution of the application is moved from the first data center to the second data center, wherein the first data center communicates a request to the second data center for storage volume replication while the first storage volume is being created at the first data center, and wherein the second storage volume is created before the information identifying the application is sent to the second data center; and establishing, by the first data center, a second mapping between the application and the first storage volume using the information identifying the application.

12. The computer-implemented method of claim 11, wherein the information identifying the application comprises an application storage reference of the application, the application storage reference being used for identifying storage for the application.

13. The computer-implemented method of claim 11, further comprising:

replicating, by the first data center, data or metadata associated with the application to the second data center.

14. The computer-implemented method of claim 11, wherein the first data center and the second data center use different application orchestration systems.

15. The computer-implemented method of claim 11, further comprising:

locating, by the first data center, data associated with the application according to the second mapping between the application and the first storage volume.

16. The computer-implemented method of claim 11, wherein the first data center or the second data center is a hybrid cloud based data center.

17. A first data center comprising:

at least one processor; and a non-transitory computer readable storage medium storing programming for execution by the at least one processor, the programming including instructions to:

create a first storage volume for an application that is started at the first data center;

communicate with a second data center for creating a second storage volume for the application at the second data center, the second storage volume replicating the first storage volume;

send information identifying the application to the second data center for the second data center to notify an application orchestration system used by the second data center about a mapping between the application and the second storage volume using the information identifying the application and for the second data center to use for identifying the second storage volume for the application when execution of the application is moved from the first data center to the second data center, wherein the first data center communicates a request to the second data center for storage volume replication while the first storage volume is being created at the first data center, and wherein the second storage volume is created before the information identifying the application is sent to the second data center; and establish a second mapping between the application and the first storage volume using the information identifying the application.

18. The first data center of claim 17, wherein the information identifying the application comprises an application storage reference of the application, the application storage reference being used for identifying storage for the application.

19. The first data center of claim 17, wherein the programming further includes instructions to:

replicate data or metadata associated with the application to the second data center.

20. The first data center of claim 17, wherein the first data center and the second data center use different application orchestration systems.

21. The first data center of claim 17, wherein the programming further includes instructions to:

locate data associated with the application according to the second mapping between the application and the first storage volume.

22. The first data center of claim 17, wherein the first data center or the second data center is a hybrid cloud based data center.

* * * * *